United States Patent
Mäkelä et al.

(10) Patent No.: US 8,165,523 B2
(45) Date of Patent: *Apr. 24, 2012

(54) METHOD FOR INITIATING A WIRELESS TRANSFER OF DATA BETWEEN AT LEAST TWO ELECTRONIC DEVICES, ELECTRONIC DEVICE AND SOFTWARE PROGRAM THEREFOR

(75) Inventors: Jakke Mäkelä, Turku (FI); Timo Erola, Piispanristi (FI); Mikko Juhola, Muurla (FI); Jukka Linjama, Espoo (FI); Pekka Naula, Peurankatu (FI)

(73) Assignee: Nokia Corporation, Espoo (FI)

( * ) Notice: Subject to any disclaimer, the term of this patent is extended or adjusted under 35 U.S.C. 154(b) by 1318 days.

This patent is subject to a terminal disclaimer.

(21) Appl. No.: 10/557,218

(22) PCT Filed: Mar. 4, 2004

(86) PCT No.: PCT/IB2004/000684
§ 371 (c)(1),
(2), (4) Date: Mar. 3, 2008

(87) PCT Pub. No.: WO2004/082212
PCT Pub. Date: Sep. 23, 2004

(65) Prior Publication Data
US 2008/0205354 A1    Aug. 28, 2008

Related U.S. Application Data
(63) Continuation-in-part of application No. 10/390,548, filed on Mar. 14, 2003, now Pat. No. 7,724,705.

(51) Int. Cl.
*H04B 7/00*    (2006.01)

(52) U.S. Cl. ......... 455/41.2; 455/456.1; 709/227
(58) Field of Classification Search .......... 455/41.2, 455/456.1; 709/227
See application file for complete search history.

(56) References Cited

U.S. PATENT DOCUMENTS

| 3,955,140 | A  | 5/1976 | Stephens et al. |
| 6,275,932 | B1 | 8/2001 | Yamaguchi et al. ........ 713/2 |

(Continued)

FOREIGN PATENT DOCUMENTS
DE    19740934    4/1999
(Continued)

OTHER PUBLICATIONS

Korean Office Action citing KR 2001-113731 with full explanation of reasons for rejecting claims based thereon.
(Continued)

*Primary Examiner* — Lester Kincaid
*Assistant Examiner* — Steven Kelley (57) ABSTRACT

The invention relates to a method of initiating a wireless transfer of data between two electronic devices. In order to make the initiation particularly user friendly, it is proposed that a concept called "hugging" is employed. A hugging state between two electronic devices is assumed to be given if a first electronic device and a second electronic device are determined to undergo a specific motion pattern relative to each other while being at least in close vicinity to each other. Only in case such a hugging state is detected at a first device, a data transfer channel is opened for transferring data between the first device and some other device, e.g. the second device. The invention relates equally to a corresponding device and to a software program product with a corresponding software code.

31 Claims, 5 Drawing Sheets

U.S. PATENT DOCUMENTS

| | | |
|---|---|---|
| 6,529,802 B1 | 3/2003 | Kawakita et al. |
| 7,724,705 B2 * | 5/2010 | Erola et al. ............... 370/331 |
| 2002/0044549 A1 | 4/2002 | Johansson et al. |
| 2002/0049059 A1 | 4/2002 | Soininen |
| 2003/0045998 A1 | 3/2003 | Medl ............... 701/207 |
| 2004/0203381 A1 * | 10/2004 | Cahn et al. ............... 455/41.2 |
| 2004/0203382 A1 | 10/2004 | Park |
| 2005/0036476 A1 | 2/2005 | Eaton et al. |
| 2005/0198029 A1 * | 9/2005 | Pohja et al. ............... 707/8 |
| 2009/0017799 A1 * | 1/2009 | Thorn ............... 455/414.1 |

FOREIGN PATENT DOCUMENTS

| | | |
|---|---|---|
| EP | 1220501 | 7/2002 |
| EP | 1398982 | 3/2004 |
| EP | 1458136 | 9/2004 |
| KR | 2001-0052807 | 6/2001 |
| KR | 2001-113731 | 12/2001 |
| WO | WO 00/28403 | 5/2000 |
| WO | 00/54523 | 9/2000 |
| WO | WO 01/45319 | 6/2001 |

OTHER PUBLICATIONS

"Smart-Its Friends: A Technique for Users to Easily Establish Connections between Smart Artefacts", Holmquist et al., Proceedings of the 2001 UBICOMP conference at Atlanta, Georgia, Sep. 30, 2001, 6 page document.

"That one there! Pointing to establish device identity", Swindells et al., Proceedings of the 15$^{th}$ Annual ACM Symposium on User Interface Software and Techonology, vol. 4, No. 2, Oct. 27, 2002, XP-002338349, pp. 151-160.

Korean Office Action dated Apr. 6, 2007 citing KR 2001-10052807.

* cited by examiner

| | D=0 (output is "no hug") | D=1 (output is "hug") | Additional definitions |
|---|---|---|---|
| S=0 (no hug in reality) | TN (true negative, desired result) | FP; (false positive, incorrect); can be >> FN | TN+FP=S(0) --> 1 |
| S=1 (hugging occurs in reality) | FN (false negative, very serious error), must be very small | TP (true positive, desired result) | FN+TP=S(1) = 1 - S(0) |

METHOD FOR INITIATING A WIRELESS TRANSFER OF DATA BETWEEN AT LEAST TWO ELECTRONIC DEVICES, ELECTRONIC DEVICE AND SOFTWARE PROGRAM THEREFOR

CROSS-REFERENCE TO RELATED APPLICATIONS

This application is the U.S. National Stage of International application number PCT/IB2004/000684 filed Mar. 4, 2004 and published in English on Sep. 23, 2004 under International Publication Number WO 2004/082212 A2, and claiming priority from U.S. patent application Ser. No. 10/390,548 filed Mar. 14, 2003 as a continuation-in-part thereof.

FIELD OF THE INVENTION

The invention relates to a method of initiating a wireless transfer of data between at least two of at least two electronic devices. The invention relates equally to an electronic device which is suited to initiate such a wireless transfer of data, and to a software program product in which a software code for initiating a wireless transfer of data between two electronic devices is stored.

BACKGROUND OF THE INVENTION

It is known from the state of the art to enable a direct wireless transfer of data between two electronic devices, e.g. for exchanging business cards between two mobile phones. The transmission channel can be realized for instance by Bluetooth™ (BT), by means of infrared (IR) ports or by means of a Wireless Local Access Network (WLAN).

An example of the employment of a local wireless link between two electronic devices is described in document WO 00/28403 A1. This document proposes the transmission not of data but of control information between a portable controller and devices, similarly as in a traditional remote control of devices.

Initiation protocols for data transfers between wireless terminals are described for instance in documents EP1 220 501 A2 and WO 01/45319 A1.

It is a disadvantage of the known solutions that the activation and initiation of a direct wireless data transfer between two electronic devices is often considered to be complicated or annoying.

SUMMARY OF THE INVENTION

It is an object of the invention to simplify the direct, wireless transfer of data between two electronic devices from the point of view of the users of the electronic devices.

It is further an object of the invention to enable a direct, wireless transfer of data between two electronic devices in a form which constitutes a new experience to users of the electronic devices.

A method of initiating a wireless transfer of data between at least two of at least two electronic devices is proposed, which comprising at a first one of the electronic devices detecting a hugging state between the first electronic device and a second one of the electronic devices. A hugging state is assumed to be given if the first electronic device and the second electronic device are determined to undergo a specific motion pattern relative to each other while being at least in close vicinity to each other. The proposed method further comprises opening a data transfer channel as a local wireless link of the first electronic device for transferring data between the first electronic device and another than the first one of the electronic devices, when it has been detected that the first electronic device is in a hugging state with a second one of the electronic devices.

In addition, an electronic device is proposed which comprises at least one interface for establishing a local wireless link to other electronic devices and processing components for realizing the proposed method.

Finally, a software program product is proposed in which a software code for initiating a wireless transfer of data between at least two of at least two electronic devices is stored. The proposed software code realizes the steps of the proposed method, when run in a processing unit of an electronic device.

The invention relies on a concept which is referred to as "hugging". The exact definition of this term and thus of the required motion pattern can be specific to a given application. The motion pattern, which should be specific and unambiguous, may comprise a single motion or a sequence of motions performed by the users of the devices with the devices at least in close vicinity to each other. In the simplest embodiment, "hugging" means that two electronic devices are brought together physically, i.e. tapped together, or at least very close to each other. In other embodiments, "hugging" could require other, more complex motion patterns, such as sliding two electronic devices close to each other. In the most general case, the "hugging" only needs to fulfill the following criteria: The operation allows a user to define unambiguously which device he wishes to "hug" with his own device, and each of the devices can make an independent determination of whether it is probably being "hugged" by another device.

The electronic devices according to the invention will also be referred to as hug-enabled electronic devices.

The invention proceeds from the consideration that the initiation of a data transfer between two electronic devices would be particularly easy and intuitive, if this data transfer was initiated simply by entering a hugging state between two electronic devices, e.g. by bringing two electronic devices into physical contact. A channel providing the full-bandwidth required for the data transfer is only activated in case such a "hugging" has been detected.

The invention thus provides a new way to transfer images or other data between electronic devices by initiating the data transfer simply by bringing respectively two electronic devices into a hugging state.

It is an advantage of the invention that it provides an extremely intuitive user interface for a data transfer between electronic devices.

It is further an advantage of the invention that it can be implemented in some electronic devices, e.g. at least in some future mobile phone categories, without any hardware changes.

The detection of a hugging state can always be activated, or only under certain conditions, for instance upon request by a user or automatically upon a corresponding indication by an application.

In the simplest embodiment, a hugging state is detected by a mechanical or electrical activation. In such an embodiment, the entry of a hugging state can be detected basically unambiguously and free of errors. As a consequence, it is in principle impossible to detect a hugging state by accident. Such a definite detection of a hugging state could be achieved, for instance, when both devices contain a button, and pressing the devices together in a specific configuration causes both buttons to be pressed simultaneously.

In more important embodiments, the detection of a hugging state cannot be made quite this unambiguously. For these cases, the use of a polling mode is proposed, which requires only a very low bandwidth. First, the first electronic device opens a polling channel as a local wireless link. Then, the first electronic device transmits signals on the polling channel and receives signals on this polling channel. The exchanged signals can be for example "telemetry data" which is based on the results of some measurements at the involved electronic devices. Finally, the first electronic device determines whether it is in a hugging state with a corresponding second electronic device, which has equally opened a polling channel, by evaluating data measured by the first device and signals received via the polling channel. It is to be noted that the data measured by the first device can be results of measurements performed on the signals received via the polling channel.

There are various possibilities for causing an electronic device to enter the polling mode, i.e. to open a polling channel and to perform the required measurements and evaluations. A polling mode can be entered either upon initiation by a user, automatically or by a mixed approach. There may also be additional layers of security, which are not crucial for this invention.

In case the polling mode is to be initiated by a user, the initiation is preferably extremely simple. This can be achieved for example by providing a dedicated button which is to be pressed for entering the polling mode. Alternatively, pressing a predefined sequence of regular keys or any other suitable action can be required.

In case the polling mode is to be entered automatically, it may be entered whenever a regular sampling of a polling channel in a low-energy QUICK_POLL_CHECK_MODE shows that a second electronic device nearby is in a polling mode. Such a regular sampling may take place for instance every few seconds. While this approach is particularly comfortable for the user, it has to be taken into account that it requires power overhead from the electronic equipment and also has potential security weaknesses. The polling mode could also be entered automatically whenever it is determined in any suitable way that a corresponding second electronic device, or at least any other object, is very close. Moreover, the polling state can be entered automatically whenever data of a predetermined type is uniquely identified in the first electronic device, e.g. when user-generated images are displayed on a screen of an electronic device, when audio signals are made available to the user, or when thumbprints or hyperlinks appear on the screen.

Some possibilities of entering the polling mode have to be combined with at least one other possibility of entering the polling mode, in order to enable two electronic devices to initiate a transfer of data. In one possible embodiment, for example, various hug-enabled electronic devices are by default in the above presented QUICK_POLL_CHECK_MODE. Whenever data of a certain type of data is uniquely identified in one of the electronic devices, this electronic device is caused automatically to enter the polling mode. If there is further one of the other hug-enabled electronic devices within the transmission range of the first electronic device, it will eventually detect that the first electronic device is in the polling mode during the regular sampling of the polling channel and also enter the polling mode. The data transfer can then be activated as proposed via "hugging".

There are also various possibilities for determining whether the first electronic device is in a hugging state with a second electronic device which has equally opened a polling channel.

In one preferred embodiment, proximity sensors are used for proximity measurements in the polling mode. The proximity sensors could operate, for instance, based on optical, electromagnetic, electrostatic, magnetic, or other principles. When an electronic device enters the polling mode, it switches on its proximity sensor. If the proximity sensor detects another object in the proximity, the electronic device transmits a flag on the opened polling channel. In case the electronic devices also receives a corresponding flag on the polling channel basically at the same time, it is a reasonable guess that two hug-enabled electronic devices have been brought close together and thereby entered a hugging state. The invention thus opens the possibility of a new use of proximity sensors.

In another preferred embodiment, existing Infrared Data Association (IrDA) ports are made use of for proximity measurements in the polling mode. An IrDA port of an electronic device is set to a mode in which the IrDA port emits infrared signals with a specified intensity. At the same time, the electronic device polls for infrared signals received via the IrDA port. In case the intensity of received infrared signals corresponds to a predefined intensity which can be expected if the first electronic device and the second electronic device undergo the specific motion pattern relative to each other, a hugging state can be assumed. Depending on the selected motion pattern, the expected intensity can be for instance basically equal to the specified intensity or a known time-dependent function. For example, when the intensity of a received infrared signal is almost the same as the intensity of the transmitted infrared signal, it can be assumed that the IrDA port of the electronic device is more or less touching the IrDA port of another electronic device in the polling mode. Fuzzy reasoning may be employed to determine whether or not the first electronic device should actually be considered to be in a hugging state with a second electronic device which has equally opened a polling channel.

In another preferred embodiment, acceleration sensors are used for proximity measurements in the polling mode. In case the acceleration sensors of two hug-enabled electronic devices register at the same time an acceleration-deceleration profile which can be expected at the respective electronic device in case it undergoes the specific motion pattern, this means that most likely they have entered a hugging state. The acceleration-deceleration profile may consist in a single value, but also be a more complex function of time, depending on the definition of the specific motion pattern. The required exchange of information in the form of an acceleration indication is carried out via the initialized polling channel. Fuzzy reasoning may be employed to determine whether or not the first electronic device should actually be considered to be in a hugging state with a second electronic device which has equally opened a polling channel.

In yet another preferred embodiment, the polling channel itself could be used for proximity measurements in the polling mode. The hug-enabled electronic devices transmit signals on the opened polling channel. It is then assumed by the first device that it is in a hugging state with some other hug-enabled device, in case a measured intensity of signals received on the polling channel behaves according to a predefined function of time which can be expected in case the first and the second electronic device undergo the selected specific motion pattern. For example, in case the electronic devices detect that the channel intensity grows quickly and then stays at the maximum possible value, most likely the electronic devices have been touched together. Fuzzy reasoning may be employed to determine whether or not an electronic device should actually be considered to be in a hugging state with another electronic device which has equally opened a polling channel. In case the polling channel is based on Bluetooth™, in addition the adaptivity of the Bluetooth™ channel intensity has to be taken into account for making the approach robust.

Further possibilities for detecting a hugging state include for instance an audio-based proximity sensing, in which the devices listen to audio signals emitted by other devices, a detection which is based on the sound of a contact, e.g. the tapping sound caused if the devices are brought in contact quickly, a detection using application-specific contact sensors, e.g. small rods that bend when in or near contact, a visual identification of the "hugging" motion, e.g. with a camera equipped with motion sensing, and any other method capable of sensing close proximity and the specific motion used to perform the "hugging". The specific mechanism used for the detection of the hugging state is not relevant for the basic concept of this invention, especially if a multi-input reasoning is used, as described below, which ensures that possible systematic, random or unpredictable skews, errors or operational failures in any single mechanism can be offset by the respective other mechanisms.

Advantageously, the final decision whether or not an electronic device should be considered to be in a hugging state with another electronic device is based on a plurality of criteria, e.g. based on several of the above proposed embodiments. The electronic device then makes a reasoning on whether it is possible that it has been "hugged". In practice, more than one proximity sensor should be employed to this end. A "hug" can be considered to be possible, for instance, if at the same time a proximity sensor detects a close object and infrared signals are being received at a high intensity and the electronic device has experienced a deceleration.

In one embodiment of the invention, a special sensor system is employed for reliably detecting a hugging state. The sensor system is for example able to carry out three types of detections, namely proximity, deceleration and physical contact between electronic devices. Since no known sensor by itself is able to take care of these three functions, advantageously multiple sensors are used for this sensor system. The outputs of these sensors thus have to be combined in a suitable way. In this, it has to be taken into account that a hugging state is entered rarely, which implies that the measurement results form a respective long series of negatives with, for instance, only one positive. Further, it should be ensured that the system basically never rejects a genuine "hugging". Finally, it has to be taken into account that different sensors may produce incompatible results.

It is proposed that in case of multiple sensors, each sensor makes an independent evaluation of whether a "hugging" has occurred. The system should moreover be calibrated such that false positives are expected to occur, that is, such that the system will occasionally consider a hugging state to be given even though this is not the case. The behavior of the false positives can be monitored for each sensor. If the behavior is anomalous due to either too many or too few false positives, the output of the respective sensor is momentarily ignored. The final decision can then be made based on the output of each considered sensor and possibly in addition on known reliability factors of each sensor. The separate and combined evaluation of the sensor outputs can be realized in particular by an algorithm.

In a further embodiment of the invention, the intensity of a physical contact of an electronic device with some other object is monitored. Moreover, a threshold value is specified for this monitored knock intensity, above which the detection of a hugging state is disabled. Alternatively or in addition, a warning signal can be output in this case. This helps to prevent users from knocking their electronic devices too hard together or to some other object for entering a hugging state, and thus from risking breaking the electronic device.

In a further embodiment, the polling channel is not switched on by default. Instead, each hug-enabled electronic device constantly or regularly searches for another electronic device close by itself, e.g. according to one of the possibilities presented above. This embodiment is usable in particular in cases in which the power consumption is not a key issue, e.g. when the device is a tabletop application, or in cases in which the searching can be performed with very little power consumption.

If the electronic device decides that a "hug" is possible, it opens the polling channel and sends a QUERY_FOR_OTHER_DEVICE signal querying for other hug-enabled electronic devices. If the electronic device receives simultaneously a QUERY_FOR_OTHER_DEVICE signal from another electronic device, it is possible that the two devices are in a hugging state. Thereupon, additional information should be transferred between the electronic devices, and the data transfer channel is activated if the additional information shows that a "hugging" has actually occurred. In order to avoid potential security problems with an electronic device that polls other electronic devices even when the user is not aware of it, this mode could be entered only at the request of the user.

Compared to the last presented embodiment, the other proposed embodiments are more reliably likely not to miss a "hug". Moreover, they require less power consumption, since they do not require evaluations and polling all the time.

While the proposed electronic devices are enabled to enter a hugging state when they are in close proximity to each other, in some situations, a comfortable, direct transfer of data might be desired without a close proximity between the involved electronic devices. Such a situation might be given, for instance, in case several persons are sitting around a large table. In one embodiment of the invention, therefore a "remote hugging state" can be defined in addition, which does not require a close proximity. A remote hugging state of an electronic device is detected upon request by a user or upon an activation by an application when the electronic device undergoes a specific motion pattern. For instance, instead of knocking two electronic devices together for entering a hugging state, both could be knocked against a table or a similar surface at the same time. Alternately, the users of the electronic devices may knock or tap their devices with the hand or a finger, or shake the device once, depending on the exact way the remote "hugging" is defined. Once a remote hugging state has been detected, the data transfer can be enabled in exactly the same manner as in a hugging state requiring a close proximity. The remote hugging state may thus be enabled by the same protocol as the close proximity hugging state, except that any requirements for a close proximity or a physical contact between electronic devices are removed. For establishing a data transfer channel, a remote hugging state has to be detected at least at two electronic devices, that is, a temporal match of gestures involving electronic devices has to be given.

The electronic device from which data is to be transferred to other electronic devices might present a list of potential receiving devices to its user via a user interface. The user may then be enabled to select one or more devices from the list via the user interface. Such a selection may also consists in deselecting some of the presented devices. Thereupon, a data transfer channel may be opened only for other electronic devices selected by the user. This allows the user to restrict the data transfer to desired recipients.

Also for realizing a transfer of data on the activated data transfer channel, there are several possibilities.

In a first possible mode of operation, the proposed "hugging" is only used to initiate the data transfer channel, after which the channel is used exactly as it would be used normally, for instance as a Bluetooth™ data transfer channel using Bluetooth protocols. It is an advantage of this mode of operation that it does not require the definition of new data types or transmission protocols.

In a second possible mode of operation, the proposed "hugging" is used to transfer data between two electronic devices. The data traffic does not have to be continuous, it might consist as well of packages or objects of data, e.g. images which are transferred from display to display. For this mode of operation, security aspects should be taken into account, and also the digital rights management protection for a "hugging" transfer should be at least as stringent as for other channels. In practice, a new "ENABLE_HUGGING_TRANSFER" flag could be defined and assigned to every object which shall be allowed to be transferred. It is not necessary to add this flag explicitly to most object definitions, however, since it can be ON by default for any type of object that can be exchanged by infrared signals, Bluetooth™, Short Message Service (SMS), Multimedia Messaging Services (MMS), and so on, for instance for all icons, all business/contact cards, for images with some restrictions, etc.

In an advantageous embodiment, the objects to be moved are always formatted as MMSs or SMSs, with an additional "TRANSFER_BY_HUGGING" flag turned on. The user interface can then treat them exactly as if they were ordinary MMSs. Any necessary additional fields, e.g. a field containing the phone number of the sender, can be sent together with the MMS data. Thereby, it is in principle irrelevant for the receiving electronic device, whether the MMS was received via the ordinary air interface or by "hugging".

The data transfer can be initialized between the first electronic device and the second electronic device, between which a hugging state is detected. Another advantageous embodiment of the invention enables a "three-way hugging". In this case, the second electronic device is only employed for initializing a data transfer between the first electronic device and some other electronic device. The second electronic device is used more specifically to "hug" the first electronic device and one or more other electronic devices one after the other. The first electronic device and all of the other electronic devices open a data transfer channel, as soon as they detect that they have been "hugged" by the second device. Thereby, the second electronic device enables a data transfer between the first electronic device and one or more other electronic devices. This is particularly useful, if the first electronic device and the other electronic devices are too large to be moved themselves to enter a direct hugging state among each other.

The polling channel and the data transfer channel, respectively, can be established for instance as Bluetooth™ channel, WLAN channel, IrDA channel, etc. It is to be noted that in an optimal embodiment involving only two electronic devices, both channels will make use of the same physical channel, only the type of data which is transferred changes.

The invention can in principle be implemented with existing technology and hardware. If a device already contains at least one of the technologies mentioned above, the invention can be implemented fully in software. Additional hardware can make the invention more robust.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
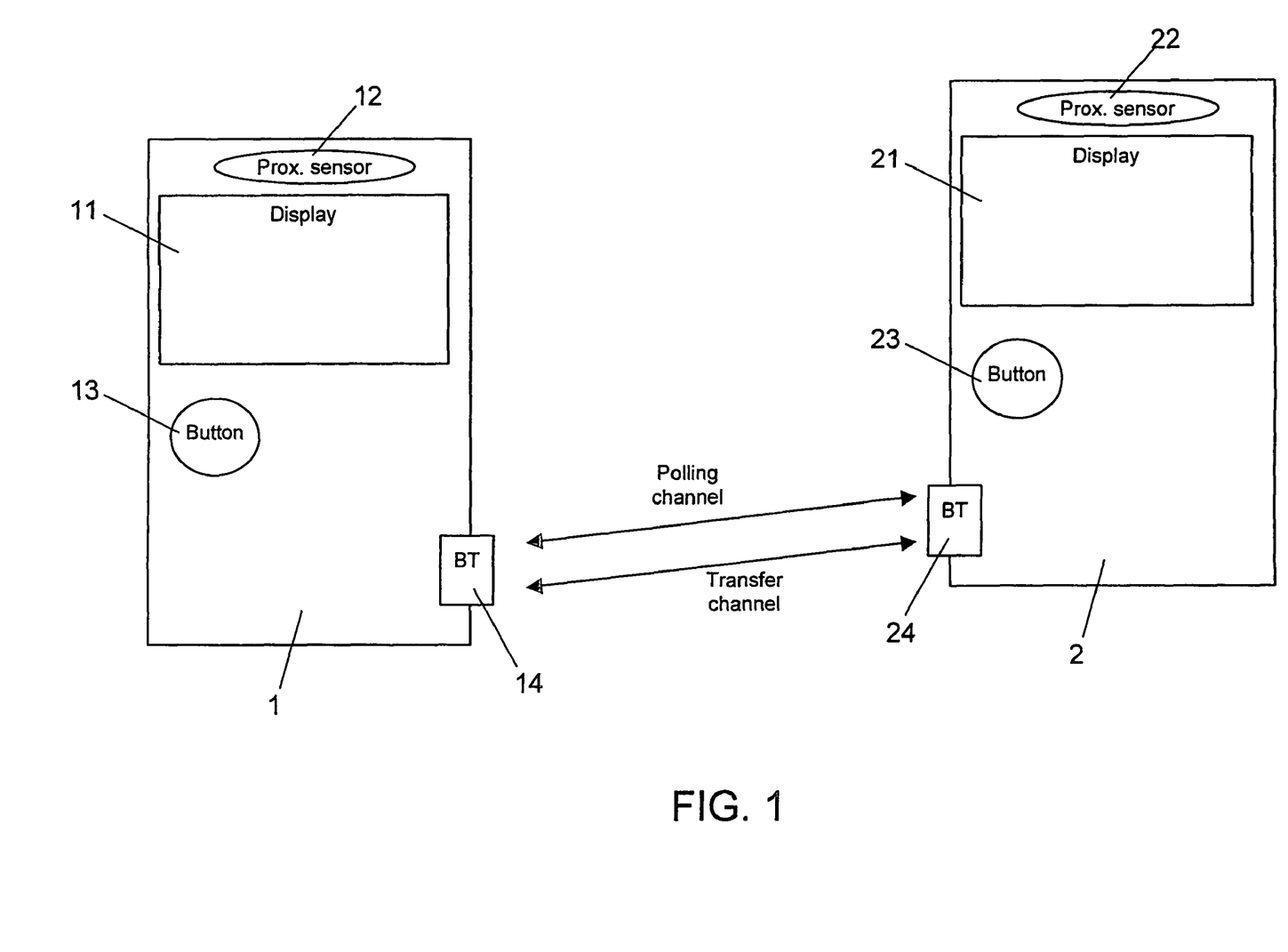
FIG. 1 schematically shows two mobile phones in which an embodiment of the invention is implemented.

FIG. 1 schematically presents two exemplary mobile phones 1, 2, which are able to initiate a transfer of data in accordance with the invention.

Each of the mobile phones 1, 2 comprises a graphical display 11, 21 and other components of conventional mobile phones (not shown). The mobile phones 1, 2 further comprise a respective proximity sensor 12, 22, and an initiation button 13, 23. In addition, each of the mobile phones 1, 2 comprises an interface 14, 24 for establishing a local wireless link to some other mobile phone. Finally, both mobile phones 1, 2 comprise a processing portion, which is not shown in FIG. 1.

Figure 2:
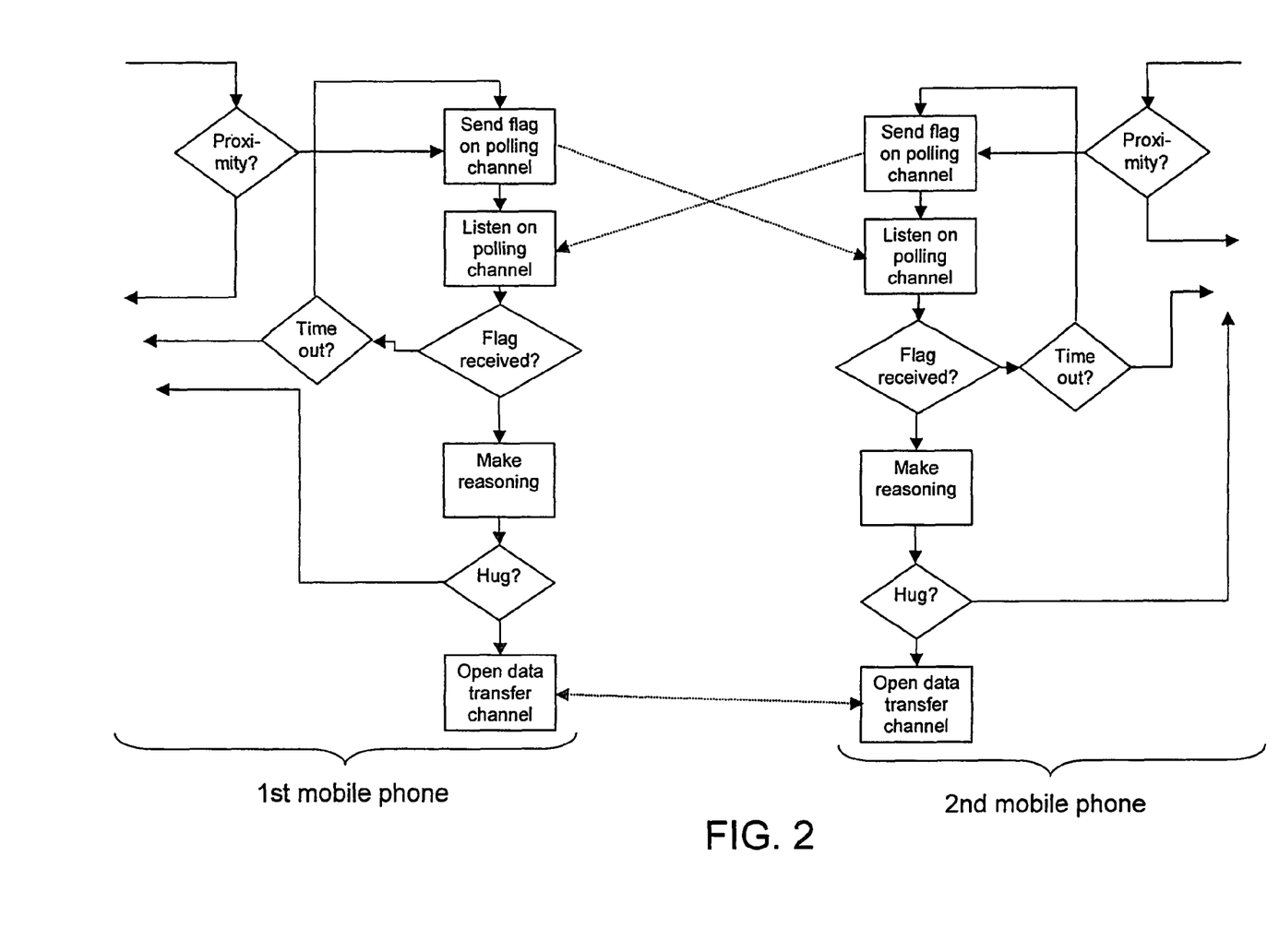
FIG. 2 is a flow chart illustrating the initiation of a data transfer between the mobile phones of FIG. 1.

The activation of a transfer of data between the two mobile phones 1, 2 will now be explained with reference to FIG. 2. FIG. 2 is a flow chart illustrating on the left hand side a processing in the processing portion of the first mobile phone 1 and on the right hand side a processing in the processing portion of the second mobile phone 2. The depicted part of the processing in both mobile phones 1, 2 is exactly the same.

In case a user of the first mobile phone 1 wishes to transfer an image, which is currently displayed on the graphical display 11 of his/her mobile phone 1, to the graphical display 21 of the second mobile phone 2, the users of both mobile phones 1, 2 press the respective initiation button 12, 22 of their phone 1, 2. As a result, a polling mode is entered by both mobile phones 1, 2. Entering the polling mode may be recorded within the phones by an "ENTER_POLLING_MODE" flag.

When the polling mode is entered, a polling channel is activated as a local wireless link with a very low bandwidth. The polling channel is activated more specifically as Bluetooth™ link via the interfaces 14, 24.

When the polling mode is entered, moreover the proximity sensors 12, 22 are switched on in both mobile phones 1, 2. Each of the proximity sensors 12, 22 checks thereupon, whether some object is detected in the vicinity.

In case the proximity sensor 12, 22 of one of the mobile phones 1, 2 detects an object in its vicinity, this mobile phone 1, 2 transmits a proximity flag on the polling channel, which is recorded in the transmitting phone 1, 2 by a "SEND_POLL_DATA" flag.

At the same time, the mobile phones 1, 2 listen on the polling channel.

In case a mobile phone 1, 2, which transmitted a proximity flag on the polling channel, does not receive a corresponding proximity flag from another mobile phone 2, 1 on the polling channel, it checks whether a counter in the mobile phone 1, 2 indicates a time out. As long as no time out is indicated, a loop is entered, in which the proximity flag is transmitted again by the mobile phone 1, 2, and in which the mobile phone 1, 2 continues listening on the polling channel. When a time out is indicated, in contrast, the polling mode is left by the mobile phone 1, 2, which is recorded in the mobile phone 1, 2 with a "LEAVE_POLLING_MODE" flag.

In case a mobile phone 1, 2, which transmitted a proximity flag on the polling channel, does receive a corresponding proximity flag from another mobile phone 2, 1 while listening on the polling channel, obviously another mobile phone 2, 1 which has entered the polling mode is present. The reception of a proximity flag is recorded in a mobile phone 1, 2 with a "RECEIVE_POLL_DATA" flag.

Next, a decision stage is entered, in which the mobile phone 1, 2 which received the proximity flag makes a reasoning whether or not the detected other mobile phone 2, 1 is basically in physical contact with the mobile phone 1, 2 which received the proximity flag. In the decision stage, one or more conditions may be checked to this end.

For example, in case a mobile phone 1, 2 receives a proximity flag from another mobile phone 2, 1 basically at the same time at which its own proximity sensor detects an object in the vicinity and transmits a first proximity flag on the polling channel, it can be assumed that the mobile phone 1, 2 has been brought into physical contact with another mobile phone 2, 1, i.e. that a hugging state is given. Further, all proximity flags may be transmitted with a specified intensity, and a hugging state can then also assumed to be given by a mobile phone 1, 2 in case a proximity flag from another mobile phone 2, 1 is received basically with the specified intensity.

In case the mobile phone 1, 2 comes to the conclusion in the decision stage that no hugging state is given, the polling channel is closed and the polling mode is left, which is recorded in the mobile phone 1, 2 with a "LEAVE_POLLING_MODE" flag. Further, the entire procedure is ended, until a user presses the respective initiation button 13, 23 again.

Also in case a hugging state is assumed to be given, the polling channel is closed and the polling mode is left, which is equally recorded in the mobile phone 1, 2 with a "LEAVE_POLLING_MODE" flag. Instead, however, a data transfer mode is entered, which is recorded in the mobile phone 1, 2 with an "ENTER_TRANSFER_MODE" flag.

When the data transfer mode is entered, a data transfer channel is activated as a local wireless link with a higher bandwidth. The data transfer channel is equally activated as Bluetooth™ link via the interfaces 14, 24 of the mobile phones 1, 2.

The activated data transfer channel is then used for transferring automatically those objects, which are currently displayed on the graphical display 11 of the first mobile phone 1 and to which a dedicated flag "ENABLE_HUGGING_TRANSFER" set to ON is associated, to the graphical display 21 of the second mobile phone 2.

The users of the two mobile phones 1, 2 thus get the impression that they have transferred an image directly from one display 11 to another display 21 simply by touching the mobile phones 1, 2 together. Therefore, the proposed initiation of the transmission implies an interesting psychological twist, and might be considered to constitute a "cute" feature of a mobile phone by certain groups of users.

The transmission of object data via the data transfer channel is recorded in the first mobile phone 1 with a "SEND_DATA" flag, while the reception of object data via the data transfer channel is recorded in the second mobile phone 2 with a "RECEIVE_DATA" flag.

When the transmission is terminated, the data transfer channel is closed and the data transfer mode is left, which is recorded in the mobile phones 1, 2 with a "LEAVE_TRANSFER_MODE" flag. Thereby, the entire procedure is ended, until a user presses the respective initiation button 13, 23 again.

It is understood that any other type of data could be transferred in the same manner between the two mobile phones, as long as the data to be transferred can be uniquely identified. Examples are audio signals which are currently being played, or data whose thumbprints or hyperlinks appear on the screen.

On the whole, it becomes apparent that the presented exemplary embodiment of the invention enables a particularly user-friendly transfer of objects from one mobile phone to another. It could be applied just the same for transferring data in a normal way via the established data transfer channel, e.g. by establishing the data transfer channel as a Bluetooth™ data transfer channel using Bluetooth™ protocols.

In the following, a central algorithm will be described which enables the use of multiple sensors operating by different principles for detecting a hugging state.

Figure 3:
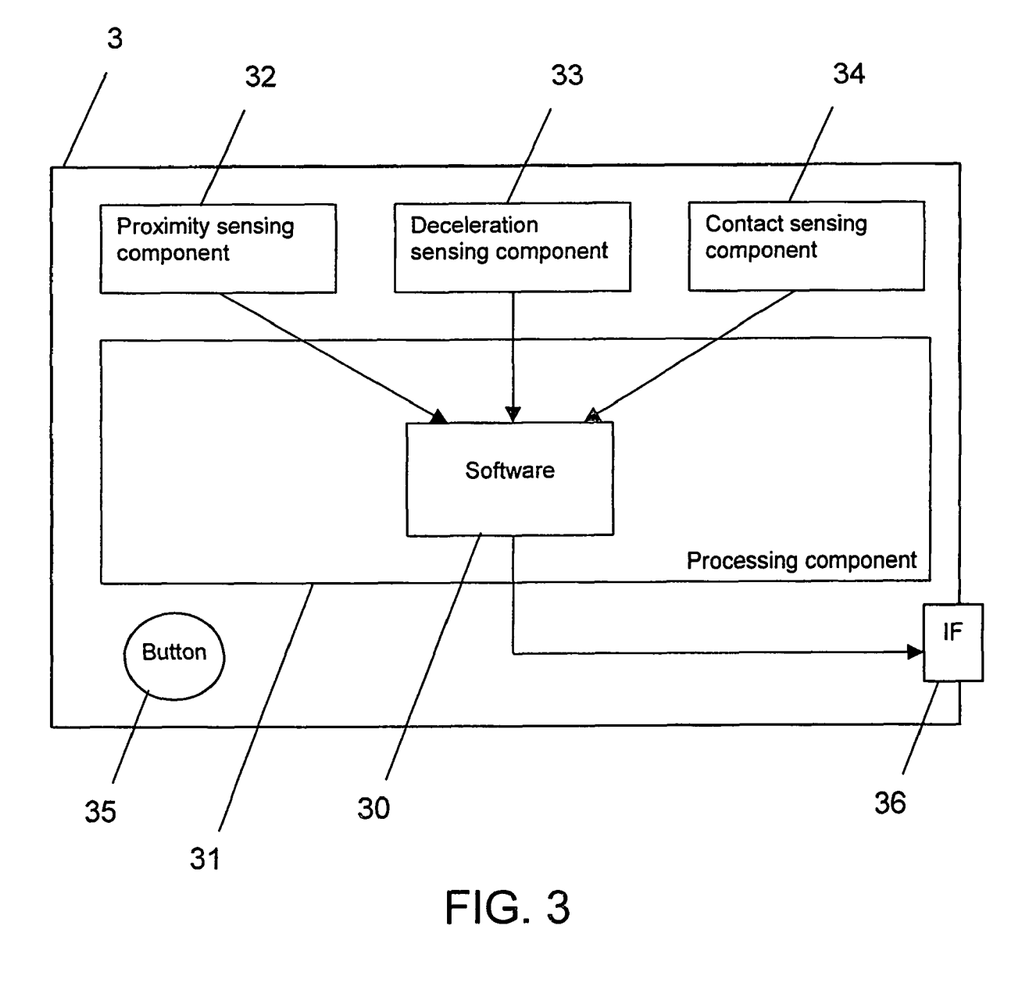
FIG. 3 is a block diagram of a mobile terminal in which another embodiment of the invention is implemented.

FIG. 3 is a block diagram of a mobile terminal 3 in which the algorithm is implemented in software 30.

The mobile terminal 3 comprises a processing component 31 for running the software 30, a proximity sensing component 32, an deceleration sensing component 33, a contact sensing component 34 and an initiation button 35. In addition, the mobile terminal 3 comprises an interface IF 36 for establishing a local wireless link to some other mobile terminal. The mobile terminal 3 further comprises other known components of conventional mobile terminals (not shown).

It has to be noted that the function of the depicted proximity sensing component 32, of the depicted deceleration sensing component 33 and of the depicted contact sensing component 34 can be realized in various ways and in various combinations of a plurality of sensors. The function of some of the depicted sensing components 32, 33, 34 may also be realized by more or less than one sensor.

The proximity of the mobile terminal 3 to some other object may be sensed for example very well by an RFID sensor or an optoelectronic proximity sensor, and quite well by an electrostatic contact meter. A deceleration of the mobile terminal 3 may be sensed very well by an acceleration meter and poorly by an RFID sensor or an optoelectronic proximity sensor. A contact of the mobile terminal 3 can be sensed by means of an audio sensor or by means of electrostatic contact meter, and poorly as well by an RFID sensor.

A user can activate a hug sensing mode of the mobile terminal 3 by pressing the initiation button 35. The hug sensing mode can be turned on thereupon for a specified period of time, for instance for one minute.

Alternatively, the hug sensing mode could be active all the time. In practice, however, this implies a high power consumption and worse usability features. Further alternatively, the hug sensing mode could also be automatically activated by an application, for instance for a specified amount of time or for the duration of the application.

During a hug sensing mode, each of the employed sensors monitors the situation with a low frequency, for instance every 0.5 seconds. Each sensor decides whether a "hugging" can be assumed to have occurred based on the parameters which it is able to measure during one time instance. Each sensor provides its decision to the processing component 30. For example, an acceleration sensor may return an indication of a "suspected hug" if a detected acceleration profile corresponds to a profile that would be expected in the case of a hug. The software 30 run by the processing component 31 then decides for each time instance based on the received indications from all sensors whether a hugging state has been entered.

Figure 4:
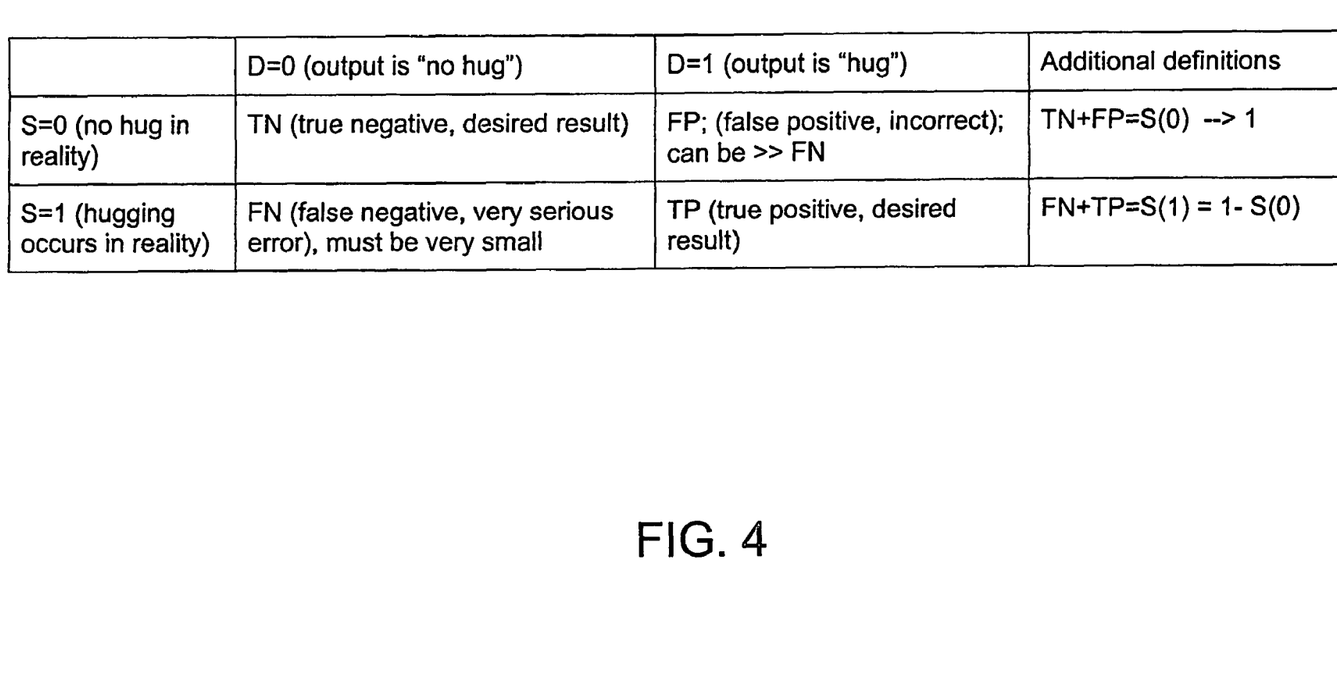
FIG. 4 is a table indicating different scenarios which are considered in the embodiment of FIG. 3.

For each time instance, there are four possible scenarios which are also summarized in the table of FIG. 4. In this table, the parameter S indicates the true action of the user, with S=0 representing no real "hugging" and S=1 a real "hugging". The parameter D indicates the decision made by the software 30, with D=0 representing no assumed "hugging" and D=1 representing an assumed "hugging".

In a scenario of true positives (TP), mobile terminals have "hugged", that is D=1, and the system detects correctly that a hugging state was entered, that is S=1. True positives are desirable.

In a scenario of false negatives (FN), mobile terminals have "hugged", that is D=1, but the system does not recognize the hugging state, that is S=1. False negatives are highly undesirable.

In a scenario of true negatives (TN), no "hugging" occurred, that is D=0, and the system detects this correctly, that is S=0. This case is desirable, and should be maximized.

In a scenario of false positive (FP), no "hugging" occurred, that is D=0, but the system believes one occurred, that is S=1. The number of false positives can be allowed to be relatively large, in order to enable a monitoring of the sensors, as will be explained further below.

The probability S(1)=FN+TP that a hugging state is entered in a given time interval is expected to be quite small, since a hugging state should be entered only occur once per time series. The probability S(0)=TN+FP that a hugging state is not entered in a given time interval is expected correspondingly to be close to 1.

Figure 5:
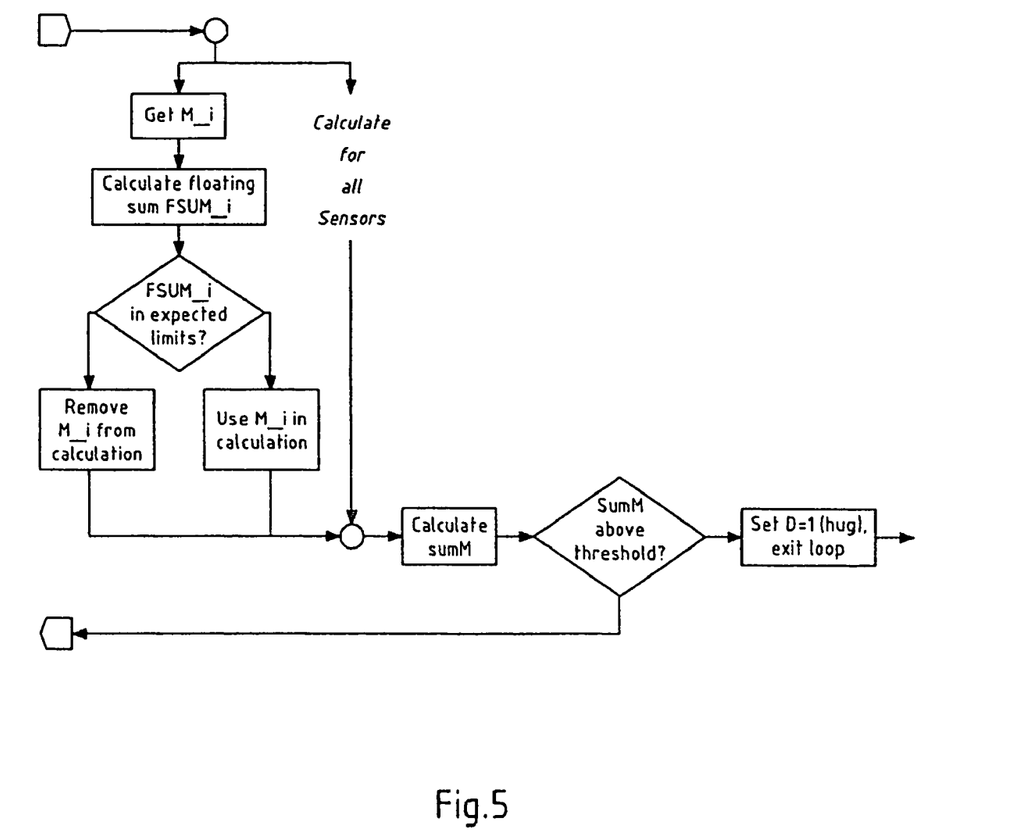
FIG. 5 is a flow chart illustrating an algorithm implemented in the mobile terminal of FIG. 3.

FIG. 5 is a schematic flow chart of the algorithm realized by the software 30.

The number of sensors realizing the sensing components 32, 33, 34 is denoted with NS, and the decision by a particular sensor i for a specific time instance is denoted with $M\_i$. $M\_i=1$ indicates that sensor i assumes the occurrence of a "hug", while $M\_i=0$ indicates that sensor i assumes no occurrence of a "hug".

In the simplest embodiment of the algorithm, the final decision could be made by summing the decisions $M\_i$ from all sensors and by setting D=1 when this sum exceeds a pre-defined threshold value. In the depicted embodiment, however, the algorithm first evaluates for each time instance the decision $M\_i$ of each sensor i, with i=1 to NS, and combines only then the decisions of selected sensors.

In many cases, one sensor may provide systematically different results than the other sensors. The erroneous scenario that can be most easily recognized is FP. False positives are not too critical. If the system is set to overtrigger, that is to result in a relatively high number of FPs, the number of FPs may be evaluated for detecting an anomalous operation of a sensor.

If the expected frequency of FPs for a sensor i is $FP0\_i$, and if the frequency of FPs is much smaller than $FP0\_i$ for a particular sensor i, it is possible that the sensor is broken or that it is in a mode in which it cannot measure accurately. In this case, the decisions $M\_i$ provided by this sensor i should not be considered for the final decision D. Similarly, if the frequency of FPs is much larger than $FP0\_i$ for a particular sensor i, the sensor may be in an anomalous mode and the provided decisions should not be considered for the final decision D.

In order to detect an anomalous mode, a floating sum of measurements can be monitored separately for each sensor over several time instances. That is, the algorithm receives from each sensor i the decision $M\_i$ for a new time instance and calculates a floating sum $FSUM\_i$ over the last NM decisions by sensor i, with i=1 to NS.

If the floating sum $FSUM\_i$ lies outside of a predetermined range around the expected frequency $FP0\_i$, the decisions of the sensor i is excluded from the determination of the final decision D, and the value of NS is decremented by one for this determination. No other changes are needed.

Advantageously, the separate evaluation of the outputs $M\_i$ of an excluded sensor i is not stopped, though. As soon as the floating sum $FSUM\_i$ for sensor i is detected to lie within the predetermined range again, sensor i can be allowed back into the measurement loop.

In the further processing, it is the most important aim to minimize false negatives. False negatives should, in principle, never occur, since this means that the system has not detected an occurred "hugging".

Because of the different sensitivities of the employed sensors and because of the need to minimize FN, the measurements $M\_i$ of different sensors i are weighted by different predetermined empirical factors $a\_i$. The calibration is best done such that the probability of a false negative is the same for every sensor. This pre-defined, small probability is denoted with KFN. In this way, sensors can be added or deleted without a need for a recalibration of the whole system, for example due to FPs exceeding predefined boundaries as described above.

The calibration measurements can be carried out differently for each sensor. The only requirement is that the calibration measurements produces the average probability of a false negative $FN\_i$ for the sensor i and the average probability of a false positive $FP0\_$for the sensor i, the latter being used to monitor a respective sensor i as described above. Then, a weight $a\_i$ which is to be employed for calibrating the output of a sensor i can be determined for instance to be $a\_i=KFN/FN\_i$.

By way of example, the value of the weight $a\_i$ for a particular sensor i can be derived by evaluating the probability of $FN\_i$ for this sensor as follows:

$$M\_i(1)=S(1)*TP\_i+S(0)*FP\_i$$

and $$M\_i(0)=S(0)*TN\_i+S(1)*FN\_i,$$

where $M\_i(1)$ is the probability of $M\_i=1$ and where $M\_i(0)$ is the probability of $M\_i=0$.

Thus, $FN\_i$ can be determined to be:

$$FN\_i=[M\_i(0)-S(0)*TP\_i]/S(1)$$

Next a weight $a\_i$ is introduced in the term on the right hand side of the preceding equation, and the resulting term is set to KFN:

$$[a\_i*M\_i(0)-S(0)*TP\_i]/S(1)===KFN$$

Thus, the weight $a\_i$ can be determined to be:

$$a\_=[KFN*S(1)+S(0)*TP\_i]/M\_i(0)$$

Once the decisions $M\_i$ of the considered sensors have been calibrated, they are summed, resulting in the sum $sumM=sum(a\_i*M\_i)$. Due to the calibration, all terms in the sum have an equal likelihood of producing KFN. Therefore, the trigger point for the detection of a hugging state, that is D=1, can be defined as: sumM/NS>K, where K is a predefined constant.

If a "hugging" is detected by the algorithm, that is if D=1, a data transfer channel is established as described above with reference to FIGS. 1 and 2 via interface 36. Otherwise, the monitoring is continued as long as the hug sensing mode is active.

The proposed algorithm has the advantage that it requires a minimal processing power and very little overhead. Moreover, the tracking of false positives allows to monitor individual sensors in a particularly simple way. The presented formalism also enables individual sensors to be cut off temporarily with no need for a recalibration of other sensors.

It has to be noted that additional constraints may be added to improve the accuracy of the system. It is a useful additional constraint, for example, to demand that the sums of all required "hug" components, namely proximity, deceleration and contact sensing components 32, 33, 34, also exceed a threshold. Thus, for example, an accelerometer contributes only to the deceleration sensing, the audio click contributes only to the contact sensing, and the optoelectronic sensor contributes to all. It can also be a requirement that measurements for all three types of sensing are present before a hugging state is assumed to be detected. However, since this can result in an increase in false negatives, this boundary constraint should be used with care and be secondary to the main algorithm.

In the presented embodiment, the values of M_i are crisp values. In an alternate embodiment, the values of M_i may also be "fuzzy", lying for instance e.g. between 0 and 1, and corresponding for instance to the probability that a "hugging" has occurred. Otherwise, the procedure is the same as described above. That is, the sum over the products a_i*M_i is calculated, and D set to '1', if the sum divided by NS exceeds a predefined threshold value K. The values of a_i can be determined from measurements as described above. This approach has the problem, though, that the results from different sensors may not be compatible, and thus the interpretation of the results is complicated. In practice, the sensor outputs have to be cross-calibrated. Dropping one of the sensors is also not as trivial as in the case of crisp values. The calculation of sumM may require additional parameters to the weights a_i, that is, the values of a_i may change depending on the configuration of the sensors that are active.

A given sensor may have different sensitivities in the (x,y,z) directions, which are coordinates fixed on the mobile terminal 3. On the other hand, a "hugging" is likely to be measured only in the direction of one axis, for example in x-direction. In this case, it is best to separate each sensor into two or three "virtual" sensors, each with its own FN_i measurements. In general these could be denoted with (MX, MY, MZ). If the direction of the hug is always known, the parallel and the perpendicular measurements (MP, MR) are sufficient.

If one or more of the employed sensors is capable of measuring the intensity of a knock, then they should be enabled in addition to return a flag, whenever they detect that the intensity of the knock exceeds a predetermined threshold value. The system is then be switched off temporarily, for example for a few cycles, and/or a warning signal is given to the user. Possible sensors of this type include acceleration sensors, which are highly sensitive, and possibly audio sensors, which are not sensitive. In practice, the sensor outputs should also be weighted for this purpose so that a less reliable sensor is not capable of triggering this state by itself.

For evaluating the presented algorithm, an analysis has been performed using preliminary data for some individual sensors, more specifically a camera sensor, an audio sensor, further optoelectronic sensors, a proximity meter and other types of sensors. Preliminary results suggest that a "hugging" is performed in perhaps 0.5 sec. Thus, a sampling rate of 2 Hz might be sufficient for the overall system, even though individual sensors may require much faster sample rates. In order to simulate a real "hugging", data from different "hugs" is used. The data is scaled so that the "hugging" occurs at approximately 3.5 s, plus/minus 0.5 sec, so that D=1 should be set off at time instances 7 and 8.

In a camera sensor as a first sensor using a 2 Hz sampling rate, any large gradient sets off the flag. The output of this camera sensor might be [0 0 0 0 1 1 1 1 1 0 0 0 . . . ].

In audio data, "hugs" are characterized by clicks having a length of maximally a few 100 ms, with different profiles than smaller knocks. The output of an audio sensor might be [0 0 0 0 0 0 1 1 0 0 0 0].

Other camera based optoelectronic sensors might have a much worse accuracy. The output by such a sensor might be [0 0 1 0 0 0 1 1 1 0 0 0 . . . ].

A traditional proximity meter, like an RFID sensor, would be highly likely to give very accurate results, for example [0 0 0 0 0 0 1 1 0 0 . . . ].

Other types of sensors might produce a large number of false positives, for example [1 1 1 0 0 1 1 0 0 1 1 1 . . . ].

First, an unweighted sum over the measurements of the different sensors at each time instance is determined.

| Camera: | [0 0 | 0 0 | 1 1 | 1 1 | 1 1 | 0 0...] |
|---|---|---|---|---|---|---|
| Audio: | [0 0 | 0 0 | 0 0 | 1 1 | 0 0 | 0 0...] |
| "Opto": | [0 0 | 1 0 | 0 0 | 1 1 | 1 0 | 0 0...] |
| Prox: | [0 0 | 0 0 | 0 0 | 1 1 | 0 0 | 0 0...] |
| Other: | [1 1 | 1 0 | 0 1 | 1 0 | 0 1 | 1 1...] |
| Sum: | [1 1 | 1 0 | 1 2 | 5 4 | 2 2 | 1 1...] |

The trigger for D=1 is set to 3 for each time instance. Thus, the hug detection is triggered off at T=7 and 8, and there are no false positives.

However, the probability of an FN is quite high, if at least two of the sensors have a very high probability of an FN.

Therefore, the sensor output are now weighted in accordance with the presented algorithm, assuming that the probability of an FN is lowest for the traditional proximity meter, for instance 0.1%. On the whole, the probabilities and the associated weights could be

| Camera: | FN probability 0.25% --> | weight 4 |
|---|---|---|
| Audio: | FN probability 0.2% --> | weight 5 |
| Opto: | FN probability 1% --> | weight 1 |
| Prox: | FN probability 0.1% --> | weight 10 |
| Other: | FN probability 0.13% --> | weight 8 |

The resulting calibrated sensor outputs a_i*M_i and the corresponding sum are shown below.

| Camera: | [0 0 | 0 0 | 4 4 | 4 4 | 4 4 | 0 0...] |
|---|---|---|---|---|---|---|
| Audio: | [0 0 | 0 0 | 0 0 | 5 5 | 0 0 | 0 0...] |
| Opto: | [0 0 | 1 0 | 0 0 | 1 1 | 1 0 | 0 0...] |
| Prox: | [0 0 | 0 0 | 0 0 | 10 10 | 0 0 | 0 0...] |
| Other: | [8 8 | 8 0 | 0 8 | 8 0 | 0 8 | 8 8...] |
| Sum: | [8 8 | 9 0 | 4 12 | 28 20 | 5 12 | 8 8...] |

A suitable trigger point might then be for example 12, which ensures that two reliable sensors are sufficient for triggering. Thus, in the above example, the "hug" detection is triggered off at T=6, 7, 8 and 10. That is, more false positives are launched, but the probability of a false negative is very low.

A further embodiment, which allows in addition the establishment of a data transfer channel upon detection of a remote hugging state, will now be described equally with reference to the mobile terminal 3 depicted in FIG. 3.

The users of two mobile terminals sitting, for example, at opposite sides of a large table agree to start a communication between their mobile terminals 3 by means of a "remote hugging".

In order to enable the "remote hugging", both users press a dedicated button 35 on their respective mobile terminal 3, or they perform a corresponding predefined softkey action. Again, the hug sensing mode could, for example, also be automatically activated by an application for a specified amount of time or for the duration of the application.

If the button 35 is also provided for enabling the entering of a close proximity hugging state, the button 35 may be pressed for example once for enabling the entering of a close proximity hugging state and twice for enabling the entering of a remote hugging state. The requirement of enabling the entering of a remote hugging state by the users is highly recommendable, since otherwise a user may start a communication by accident too easily. All sensors provided for the detection of a hugging state are thereupon switched on or kept switched on, except for those proximity sensors that depend on the closeness of another mobile terminal, mainly an RFID sensor, which are switched off or kept switched off. Proximity sensors in general may be switched on or kept switched on. Alternatively, the signals provided by proximity sensors that depend on the closeness of another mobile terminal could be blocked by the software 30 in the processing component 31, which receives the signals from all sensors as described with reference to FIG. 3.

Both users then tap their terminals 3, for example, onto the table. This remote "hug" is detected by the sensors by sensing the proximity of the respective mobile terminal 3 to some surface and by sensing in addition a knock, for instance by means of an acceleration sensor, an audio based sensor, an optics based sensor, or some other suitable sensor.

Beside the circumstance that the signals from some sensors are not considered by principle, thus the same algorithm can be used for detecting the remote hugging state as described with reference to FIGS. 3 to 5.

If the detection of a hugging state and the possibility of establishing a data transfer channel when a hugging state has been detected is already implemented in a mobile terminal, the option of entering a remote hugging state requires no extra overhead and only minor changes.

The option of entering a remote hugging state provides a new usability to mobile terminals. It allows for example to perform a "hugging" through windows. This is of particular interest in a car environment. Further, it allows a user to start a communication without requiring the user to take the mobile terminal out of a pocket, for example in case of a tap control with tactile feedback. Further, the option of entering a remote hugging state enables a communication in a room environment in which it is difficult to bring two mobile terminals into close proximity, for example at a conference table. Moreover, it enables a selective data transfer in a group. The "remote hugging" could be used for instance for collecting votes, for sending calendar data to only those who tap their mobile terminal when told, etc.

A person who is activating the data transfer to other terminals might also receive a list of target terminals and choose to deselect one or more terminals from the list. This should be done at an application level.

Since some sensors are kept off compared to the case in which a close proximity hugging state is to be enabled, the power consumption may even be lower.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising at a first one of at least two electronic devices:
    detecting a hugging state between said first electronic device and a second one of said electronic devices, a hugging state being assumed to be given if said first electronic device and said second electronic device are determined to undergo a specific motion pattern relative to each other while being at least in close vicinity to each other, wherein said detecting a hugging state comprises:
        opening a polling channel as a local wireless link of said first electronic device;
        transmitting signals on said polling channel and receiving signals on said polling channel; and
        determining whether said first electronic device is in a hugging state with a corresponding second electronic device by evaluating data measured by said first device and signals received via said polling channel; and
    opening a data transfer channel as a local wireless link of said first electronic device for transferring data between said first electronic device and another than said first one of said electronic devices, when it has been detected that said first electronic device is in a hugging state with a second one of said electronic devices.

2. The method according to claim 1, wherein detecting a hugging state between said first electronic device and a second electronic device comprises a detection of at least one of a mechanical and an electrical interaction between said first electronic device and a second electronic device.

3. The method according to claim 1, wherein said polling channel is opened by said first electronic device upon initiation by a user.

4. The method according to claim 1, wherein said polling channel is opened automatically by said first electronic device at least one of:
    when a regular sampling of said polling channel shows that a second electronic device located in the vicinity is transmitting signals on said polling channel;
    when proximity measurements performed by said first electronic device indicate that a second electronic device is in the vicinity; and when data of a predetermined type is currently uniquely identified in said first electronic device.

5. The method according to claim 1, further comprising performing at said first electronic device proximity measurements using a proximity sensor for detecting close objects when said polling channel is opened, wherein said first electronic device transmits a proximity indication on said polling channel in case a close object is detected by said proximity sensor, and wherein said first electronic device determines that it is in a hugging state with a second electronic device which has equally opened said polling channel, in case said first electronic devices receives basically at the time of transmission of said proximity indication a proximity indication transmitted by a second electronic device on said polling channel.

6. The method according to claim 1, further comprising determining the acceleration of said first electronic device using an acceleration sensor in said first electronic device when said polling channel is opened, wherein said first electronic device transmits an acceleration indication on said polling channel in case said acceleration sensor detects a predefined acceleration-deceleration profile which can be expected for said first electronic device in case said first electronic device and said second electronic device undergo said specific motion pattern relative to each other, and wherein said first electronic device determines that it is in a hugging state with a second electronic device which has equally opened said polling channel, in case said first electronic device receives basically at the time of transmission of said acceleration indication a corresponding acceleration indication transmitted by a second electronic device on said polling channel.

7. The method according to claim 1, wherein said first electronic device measures the intensity of signals received on said polling channel, and wherein said first electronic device determines that it is in a hugging state with a second electronic device which has equally opened said polling channel, in case at least one of:
a measured intensity of signals received on said polling channel behaves according to a predefined function of time which can be expected in case said first and said second electronic device undergo said specific motion pattern relative to each other; and
a measured intensity of received signals corresponds to a predefined intensity, which can be expected if said first electronic device and said second electronic device undergo said specific motion pattern relative to each other.

8. The method according to claim 1, wherein said first electronic device determines based on at least one of the following approaches whether it is in a hugging state with a second electronic device which has equally opened said polling channel: an audio-based proximity sensing, a detection which is based on the sound of a contact, a detection using application-specific contact sensors, and a visual identification of said specific motion pattern.

9. The method according to claim 1, wherein said first electronic device only determines that it is in a hugging state with a second electronic device, in case a plurality of conditions are met which indicate that said first electronic device is in a hugging state with a second electronic device.

10. The method according to claim 1, wherein a plurality of sensors of said first electronic device are employed for detecting a hugging state between said first electronic device and a second one of said electronic devices, each sensor providing an indication when it determines that a hugging state is entered, and each sensor being calibrated such that it erroneously determines with a known probability that a hugging state is entered, said method further comprising monitoring for each sensor the frequency of an indicated hugging state and excluding a sensor from further consideration in case a monitored frequency of an indicated hugging state deviates from a frequency expected due to said known probability, and detecting a hugging state between said first electronic device and a second one of said electronic devices based on the indications from all sensors not excluded from consideration.

11. The method according to claim 10, wherein a hugging state between said first electronic device and a second one of said electronic devices is detected by weighting and combining the indication from all sensors not excluded from consideration.

12. The method according to claim 1, wherein fuzzy reasoning is employed for determining whether said first electronic device is in a hugging state with a second electronic device.

13. The method according to claim 1, wherein an intensity of a possible contact between said first electronic device and a second one of said electronic devices is monitored, and wherein in case an intensity of a contact is determined to exceed a predetermined value, an alarm is output and/or the detection of a hugging state is disabled.

14. The method according to claim 1, wherein detecting a hugging state between said first electronic device and a second one of said electronic devices is activated by at least one of a user input to said first electronic device and an indication from an application of said first electronic device.

15. The method according to claim 1, wherein said data is transferred in form of packages or objects of data.

16. The method according to claim 1, wherein said other than said first one of said electronic devices is the same as said second one of said electronic devices.

17. The method according to claim 1, where said other than said first one of said electronic devices is a third one of said electronic devices, said second electronic device functioning as a medium for opening a data transfer channel for transferring data between said first electronic device and said third electronic device.

18. The method according to claim 1, wherein said first electronic device is a mobile device and wherein said second electronic device is a mobile device.

19. An electronic device comprising implemented software and a processing component, the software with the processing component configured to cause the electronic device to perform at least:
determine whether said electronic device is in a hugging state with a corresponding second electronic device, a hugging state being assumed to be given if said electronic device and said second electronic device are determined to undergo a specific motion pattern relative to each other while being at least in close vicinity to each other, wherein determining whether said electronic device is in a hugging state with a corresponding second electronic device comprises
open a polling channel as a local wireless link;
cause a transmission of signals on said polling channel and a reception of signals on said polling channel; and
evaluate data measured by said electronic device and signals received via said polling channel; and
open a data transfer channel as a local wireless link for enabling a transfer of data between said electronic device and another electronic device, when it has been determined that said electronic device is in a hugging state with a second electronic device.

20. The electronic device according to claim 19, wherein the software with the processing component is further configured to cause the electronic device to:
  determine upon initiation by one of a user and an application whether said electronic device entered a remote hugging state, a remote hugging state being assumed to be given if said electronic device is determined to undergo a predetermined motion pattern; and
  open a data transfer channel for enabling a transfer of data between said electronic device and another electronic device, when it has been determined that said electronic device is in a remote hugging state.

21. The electronic device according to claim 20, further comprising a user interface, the software with the processing component further configured to cause the electronic device to present to a user of said electronic device a list of other electronic devices via said user interface and to enable a user to select electronic devices from said list via said user interface, wherein a data transfer channel is opened only for other electronic devices selected by a user.

22. The electronic device according to claim 19, wherein said electronic device is a mobile device and wherein said second electronic device is a mobile device.

23. The electronic device according to claim 19, wherein the software with the processing component is configured to cause the electronic device to open said polling channel automatically at least one of:
  when a regular sampling of said polling channel shows that a second electronic device located in the vicinity is transmitting signals on said polling channel;
  when proximity measurements performed by said electronic device indicate that a second electronic device is in the vicinity; and
  when data of a predetermined type is currently uniquely identified in said electronic device.

24. The electronic device according to claim 19, wherein the software with the processing component is configured to cause the electronic device to perform proximity measurements using a proximity sensor for detecting close objects when said polling channel is opened, to transmit a proximity indication on said polling channel in case a close object is detected by said proximity sensor, and to determine that said electronic devices is in a hugging state with a second electronic device which has equally opened said polling channel, in case said electronic devices receives basically at the time of transmission of said proximity indication a proximity indication transmitted by a second electronic device on said polling channel.

25. The electronic device according to claim 19, wherein the software with the processing component is configured to cause the electronic device to determine the acceleration of said electronic device using an acceleration sensor when said polling channel is opened, to transmit an acceleration indication on said polling channel in case said acceleration sensor detects a predefined acceleration-deceleration profile which can be expected for said electronic device in case said electronic device and said second electronic device undergo said specific motion pattern relative to each other, and to determine that said electronic device is in a hugging state with a second electronic device which has equally opened said polling channel, in case said electronic device receives basically at the time of transmission of said acceleration indication a corresponding acceleration indication transmitted by a second electronic device on said polling channel.

26. The electronic device according to claim 19, wherein the software with the processing component is configured to cause the electronic device to determine based on at least one of the following approaches whether said electronic device is in a hugging state with a second electronic device which has equally opened said polling channel: an audio-based proximity sensing, a detection which is based on the sound of a contact, a detection using application-specific contact sensors, and a visual identification of said specific motion pattern.

27. The electronic device according to claim 19, wherein the software with the processing component is configured to cause the electronic device to measure an intensity of signals received on said polling channel, and to determine that the electronic device is in a hugging state with a second electronic device which has equally opened said polling channel, in case at least one of:
  a measured intensity of signals received on said polling channel behaves according to a predefined function of time which can be expected in case said electronic device and said second electronic device undergo said specific motion pattern relative to each other; and
  a measured intensity of received signals corresponds to a predefined intensity, which can be expected if said first electronic device and said second electronic device undergo said specific motion pattern relative to each other.

28. The electronic device according to claim 19, further comprising a plurality of sensors configured to be employed for detecting a hugging state between said electronic device and said second electronic device, each sensor being configured to provide an indication when it determines that a hugging state is entered, and each sensor being calibrated to determine with a known probability that a hugging state is entered in false positives; wherein the software with the processing component is further configured to cause the electronic device to perform:
  monitor for each sensor the frequency of an indicated hugging state and for excluding a sensor from further consideration in case a monitored frequency of an indicated hugging state deviates from a frequency expected due to said known probability; and
  detect a hugging state between said electronic device and said second electronic device based on the indications from all sensors not excluded from consideration.

29. The electronic device according to claim 19, where said other electronic device is a third electronic device, said second electronic device functioning as a medium for opening a data transfer channel for transferring data between said electronic device and said third electronic device.

30. The electronic device according to claim 19, wherein the electronic device is a mobile phone.

31. A software program product in which a software code is stored, said software code realizing the following when running in a processing unit of a first one of at least two electronic devices:
  determining whether said first electronic device is in a hugging state with a corresponding second one of said electronic devices, a hugging state being assumed to be given if said first electronic device and said second electronic device are determined to undergo a specific motion pattern relative to each other while being at least in close vicinity to each other, wherein said determining whether said first electronic device is in a hugging state with a corresponding second one of said electronic devices comprises:
    opening a polling channel as a local wireless link of said first electronic device;
    transmitting signals on said polling channel and receiving signals on said polling channel; and determining whether said first electronic device is in a hugging state with a corresponding second electronic device by evaluating data measured by said first device and signals received via said polling channel; and opening a data transfer channel as a local wireless link of said first electronic device for transferring data between said first electronic device and another than said first one of said electronic devices when it has been determined that said first electronic device is in a hugging state with a second electronic device.

* * * * *